(12) United States Patent
Roether et al.

(10) Patent No.: US 6,948,525 B2
(45) Date of Patent: Sep. 27, 2005

(54) PILOT VALVE COMPRISING A VALVE SEAT ARRANGEMENT

(75) Inventors: Friedbert Roether, Cleebronn (DE); Siegmund Deja, Freiberg (DE); Eberhard Schaffert, Leonberg (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/475,677

(22) PCT Filed: Apr. 26, 2002

(86) PCT No.: PCT/EP02/04632
§ 371 (c)(1),
(2), (4) Date: Jul. 9, 2004

(87) PCT Pub. No.: WO02/102636
PCT Pub. Date: Dec. 27, 2002

(65) Prior Publication Data
US 2004/0232367 A1 Nov. 25, 2004

(30) Foreign Application Priority Data
Apr. 26, 2001 (DE) .......................................... 101 20 322

(51) Int. Cl.$^7$ ............................................... F16K 31/00
(52) U.S. Cl. ..................................... 137/627.5; 303/15
(58) Field of Search ........................ 137/627.5; 303/15, 303/118.1; 251/30.01

(56) References Cited

U.S. PATENT DOCUMENTS 3,525,555 A * 8/1970 Braun et al. ................... 303/15
3,907,379 A * 9/1975 Lawson ...................... 303/118.1
5,154,203 A   10/1992 Krause et al. ............ 137/116.3
5,666,995 A * 9/1997 Herbst et al. ............. 137/627.5
5,771,933 A * 6/1998 Akamatsu et al. ........ 137/627.5
6,142,183 A * 11/2000 Karthaeuser .............. 137/627.5
6,238,013 B1 * 5/2001 Koelzer ..................... 303/118.1
6,374,857 B1 * 4/2002 Linkenbach ............. 137/627.5

FOREIGN PATENT DOCUMENTS

DE    196 05 562 A    8/1997
FR    2 705 741 A    12/1994

* cited by examiner

Primary Examiner—John Bastianelli
(74) Attorney, Agent, or Firm—Crowell & Moring LLP

(57) ABSTRACT

An electropneumatic regulating valve for an air brake system of a motor vehicle, with a valve seat assembly which switches compressed air flow between at least one external brake line connection, a feed pressure connection, and a venting port, the valve seat assembly including a coaxial valve seat assembly with external and internal valve seats and a pot-like sealing cup with a coaxial passage. A ring-shaped, surface of the sealing cup seals between the exterior and interior valve seats. The opposing face of the ring-shaped surface has two coaxial sealing lip segments projecting away from the ring-shaped surface and forming an annular space therebetween. The sealing cup includes a reinforcing insert with a U-shaped cross-section located in the annular space which reinforces the ring-shaped surface and the sealing lip segments. The insert also has a molded-on shoulder which reinforces the inside radial area of the sealing area.

18 Claims, 2 Drawing Sheets

PILOT VALVE COMPRISING A VALVE SEAT ARRANGEMENT

The present application is a 371 of International Patent Application No. PCT/EP02/04632, filed Apr. 26, 2002, designating the United States of America and published in German as WO 02/102636, the entire disclosure of which is incorporated herein by reference. Priority is claimed based on Federal Republic of Germany Patent Application No. 101 20 322.5, filed Apr. 26, 2001.

BACKGROUND AND SUMMARY OF THE INVENTION

The invention relates to a pre-controlled valve, in particular an electropneumatic regulating valve for an air brake system of a motor vehicle.

The electropneumatic regulating valve of the present invention comprises a valve housing, which contains an axially adjustable control piston and which can be actuated by means of at least one electromagnetic pilot valve for axial adjustment, and which is provided to actuate a valve seat assembly, which switches the compressed air flow between at least one external brake line connection, a feed pressure connection, as well as a venting port, and which comprises in essence a pot-like sealing cup with a coaxial passage, the circular ring-shaped sealing area of which corresponds with a coaxial valve seat assembly, constructed out of an external valve seat and an internal valve seat. In particular the present invention relates to a special configuration of the sealing cup.

The generic pre-controlled valve is installed inside an air brake system of a utility vehicle, for example, as an electropneumatic regulating valve, in order to correct a brake pressure in accordance with the desired braking effect. For this purpose a brake line, issuing from the regulating valve, is connected usually to a brake cylinder, which is disposed at the vehicle wheel and which produces the necessary brake force for a disk or drum brake, attached to said wheel, for the purpose of braking. The desired pressure value for the electropneumatic regulating valve can be specified both electrically and also pneumatically. However, the pneumatic drive is used only for safety in the case the electric drive fails.

One such electropneumatic regulating valve is known from the DE 196 05 562 A1. The regulating valve exhibits a control piston, which has a large area and is housed inside a valve housing and which can be moved axially over a corresponding control chamber. Opposite the control chamber, the control piston borders on a working chamber. On the side of the working chamber, a coaxial hollow pin is formed on the control piston, which serves to actuate an adjacent valve seat assembly. The valve seat assembly switches, by means of an axial adjustment of a spring-stressed sealing cup, the compressed air flow between an external brake line connection, a feed pressure connection as well as a venting port.

The control piston can be actuated by way of a pilot valve assembly with a control pressure from the side of the control chamber. The pilot valve assembly comprises here two electromagnetic pilot valves, which affect, by means of a coordinated flow around the integrated electric coils, an increase, hold, or decrease in the control pressure inside the control chamber. On the side opposite the control piston, a counterforce, resulting from the brake pressure, is effective.

The valve seat assembly, which can be actuated in such a manner by the control piston, envelops the pot-like sealing cup, which is provided with a coaxial passage, in order to lead the exhaust air, accumulated while venting the control chamber, through said passage to the venting port. The remaining circular ring-shaped sealing area of the sealing cup forms together with an opposite external valve seat, which envelops a coaxial internal valve seat, a corresponding valve seat assembly.

The compressed air of the brake line connection, connected to the working chamber, is supplied by depressing the sealing cup, whereby said sealing cup lifts off from the external valve seat so that an air flow from the feed pressure connection to the working chamber is released. A venting of the working chamber, connected to the brake line connection, is achieved by raising the internal valve seat, which is made as one piece with the control piston, with the result that the compressed air flows starting from the working chamber to the venting port.

The quality of control achieved with the prior art valve seat assembly that is described above is limited by a relatively large force component, which acts from the bottom on the sealing cup in the direction of the control piston, and which is generated in essence by the influences of the brake pressure. Opposite this bottom force component there is on the other side of the sealing cup an upper force component, which exhibits a smaller amount due to a smaller effective surface—caused by the coaxial arrangement of both valve seats—in connection with the pressure in the working chamber in the closed valve position. This imbalance of the two force components results in a relatively large hysteresis of the valve seat assembly, a feature that has a negative impact on the quality of control.

Attempts have already been made to enlarge the effective circular ring-shaped sealing area of the sealing cup by decreasing further the diameter of the piston seat. However, it has turned out that the sealing cup is stressed so unfavorably in the area of the inside rim that no reliable tightness and no exact valve function can be obtained. Enlarging the external valve seat cannot be considered because of design-related restrictions.

The sealing cup is made of an elastomer and exhibits a reinforcing insert, which is formed essentially at right angles in accordance with the cross section of the edge, whereby the horizontal leg, running below the sealing area, connects to a vertical leg, extending along an external sealing lip segment, in order to reinforce in this respect the external flank of the sealing cup. Given the edge conditions described above, this geometry does not result in an enlargement of the force component above the sealing cup. In the extreme case the impact of the internal valve seat can result in a shearing off of the sealing material on the sealing cup.

Therefore, the object of the present invention is to further improve a generic pre-controlled valve to the effect that the sealing cup, used in connection with the valve seat assembly, makes it possible to decrease the internal diameter of the valve seat in order to increase the force component above the sealing cup and simultaneously ensures a reliable sealing function during continuous operation.

The problem is solved, according to the invention, starting from a precontrolled valve comprising a valve housing containing an axially adjustable control piston which can be actuated by at least one electromagnetic pilot valve, and which actuates a valve seat assembly to switch compressed air flow between at least one external brake line connection, a feed pressure connection, and a venting port, wherein the valve seat assembly includes a pot-like sealing cup with a coaxial passage. The sealing cup includes an internal reinforcing insert, which is formed essentially in the shape of a U according to the cross section of the edge and which is provided with a molded-on shoulder, which is oriented radially towards the inside and reinforces the inside radial area of the sealing area, whereby the two legs of the reinforcing insert project reinforcingly into the respectively assigned sealing lip segments of the sealing cup.

An advantage of such a designed sealing cup lies in the fact that the critical area of the sealing area that corresponds with the internal valve seat is supported in such a manner by an especially facilitating geometry of the reinforcing insert that the diameter of the valve seat can be reduced even further in order to enlarge in this respect the effective ring area above the sealing cup without impeding the axial moveability of the sealing cup. As a consequence, a smaller valve hysteresis is achieved, a feature that results in a better control quality of an electropneumatic regulating valve.

Preferably the reinforcing insert is made of a relatively rigid plastic, as compared to the enveloping elastomeric sealing material of the sealing cup, and which is vulcanized into the sealing cup. In addition, it is also conceivable to use a reinforcing insert made of steel, aluminum, or the like.

According to another embodiment of the invention, the two ring-shaped sealing lip segments, issuing from the sealing lip cup, are designed approximately the same length in order to guarantee a uniform quality of sealing in interaction with the legs of the reinforcing insert, said legs being also of equal length, without the different contact forces on the housing components, which correspond to the sealing cup, resulting in the axial moveability of the sealing cup being impeded.

According to a further embodiment of the invention, a tube segment with a venting duct can be run through the passage in the sealing cup, in order to guide the exhaust air, accumulated while venting the control chamber, directly into the area of the venting port. Correspondingly the diameter of the passage is matched with the diameter of the tube segment in such a manner that a circular ring-shaped flow cross section, which is just adequate enough to vent the working chamber.

Other objects, advantages and novel features of the present invention will become apparent from the following detailed description of the invention when considered in conjunction with the accompanying drawings.

DETAILED DESCRIPTION

Figure 1:
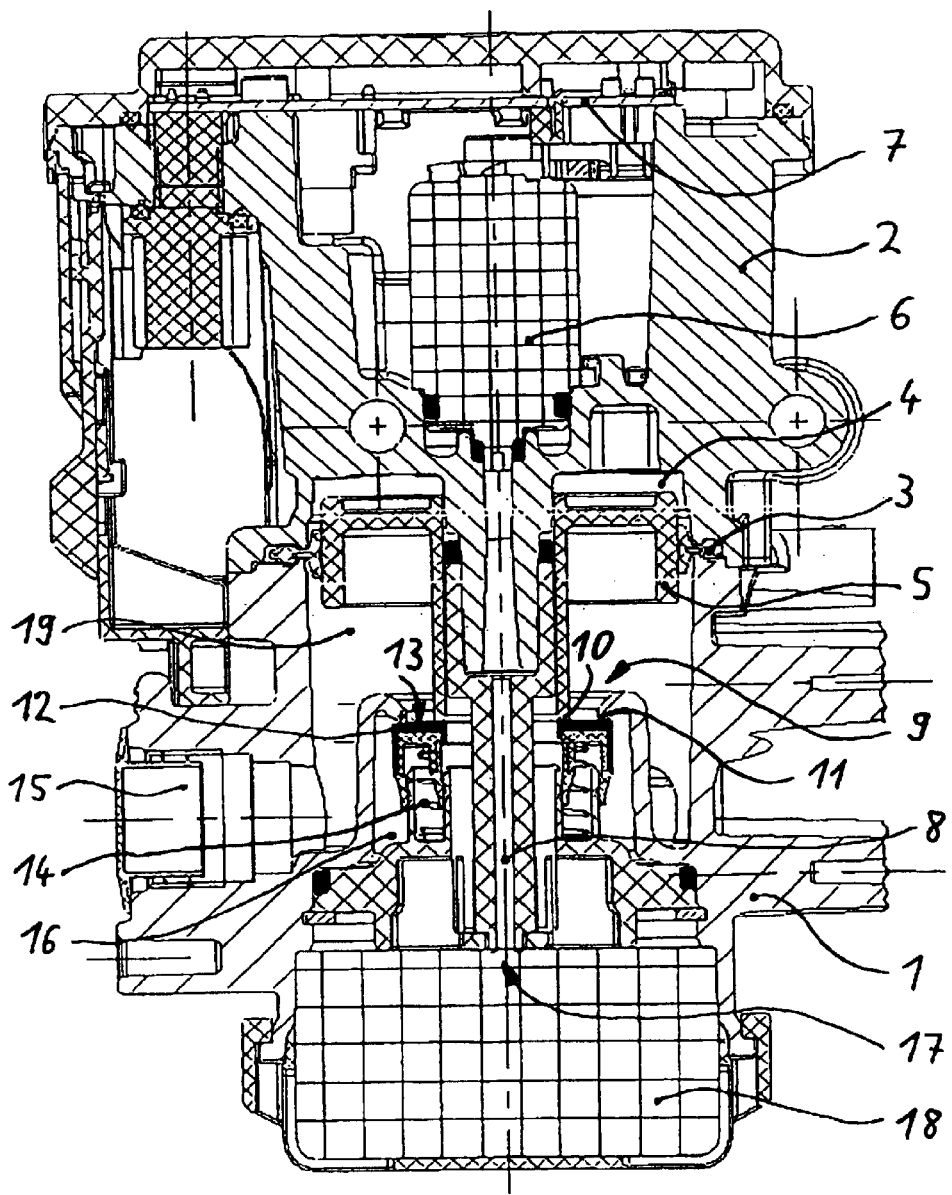
FIG. 1 is a longitudinal cross-section view through an electropneumatic regulating valve with a sealing cup in accordance with an embodiment of the invention.

The electropneumatic regulating valve, according to FIG. 1, includes a two-part housing, which comprises a bottom relay valve housing 1, which is connected by means of a screw connection to an upper pilot valve housing 2 by way of a sealing element 3, which lies in-between. The relay valve housing 1 and the pilot valve housing 2 enclose an internal cavity, which is formed as a control chamber 4, and in which a control piston 5 is disposed so as to move axially. For axial adjustment of the control piston 5, there is a pilot valve assembly, which is housed in the pilot valve housing 2 and of which here only one pilot valve 6, serving as the outlet magnet, is shown. The pilot valve assembly is driven electrically by means of an electronic unit 7, which is also disposed in the pilot valve housing 2.

The illustrated pilot valve 6 vents upon actuation of the control chamber 4, whereby the accumulated exhaust air is bled off to the atmosphere by way of a coaxial venting duct 7. In addition to the pilot valve 6, serving as the outlet valve, there is a second pilot valve (not shown here) as the inlet valve, which serves to actuate the control chamber 4 with a control pressure in order to adjust axially the control piston 5.

As a consequence of actuating the control chamber 4, the control piston 5 actuates by means of a bottom sleeve-like coaxial attachment a valve seat assembly 9. The distal end of the coaxial attachment is designed as the internal valve seat 10. In addition to the internal valve seat 10, there is an external valve seat 11, which is disposed coaxially in the same plane and which is arranged stationarily opposite the relay valve housing 1. Both valve seats 10 and 11 act together with a pot-like sealing cup 12, the sealing area 13 of which rests against the two valve seats 10 and 11 in a closed switching position of the regulating valve, which takes place, among other things, due to the effect of a pressure spring 14, disposed between the relay valve housing 1 and the sealing cup 12. Above this valve seat assembly 9 the air flow can be switched, on the one hand, between a brake line connection 15, which is disposed on the relay valve housing 1, and a feed pressure connection (cannot be seen here), which is connected to an internal feed pressure chamber 16, and, on the other hand, a venting port 17. The venting port 17 is additionally provided with a sound absorber 18 to decrease the noise of the working chamber 19, which can be connected to the brake line connection 15, as well as the exhaust air, flowing out of the venting duct 8.

The electropneumatic regulating valve is shown here in its closed switching position. Upon actuation of the control chamber 4 with a control pressure and subsequent movement of the control piston 5 in the direction of a bottom position, compressed air, issuing from the feed pressure chamber 16, flows, upon opening the external valve seat 11, by way of the working chamber 19, to the brake line connection 15, in order to increase in this respect the brake pressure.

In venting the control chamber 4, the control piston 5 is conveyed into an upper position, thus opening the internal valve seat 10, so that starting from the brake line connection 15, the compressed air flows by way of the working chamber 19 to the venting port 17, in order to reduce correspondingly the brake pressure. Thus, the brake pressure is influenced here by a reciprocating movement of the control piston 5.

Figure 2:
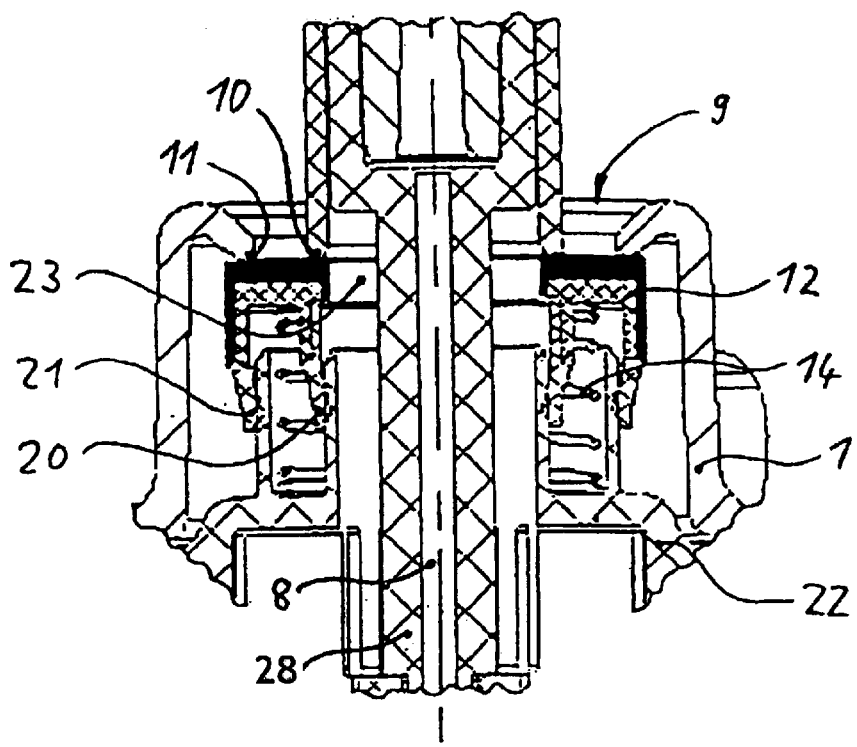
FIG. 2 is a detailed longitudinal cross-section view in the area of the valve seat assembly of the embodiment of FIG. 1.

As follows from the detailed drawing according to FIG. 2, the sealing cup 12 of the valve seat assembly 9 exhibits an internal radial sealing lip segment 20 as well as an external radial sealing lip segment 21, both of which rest sealingly against tube-shaped segments of an insert sleeve 22, which is arranged stationarily opposite the relay valve housing 1, and encloses the spring 14. A tube segment 28, containing the venting duct 8, runs through a passage 23 in the sealing cup 12, in order to guide the exhaust air, accumulated while venting the control chamber (not illustrated here), into the area of the venting port.

Figure 3:
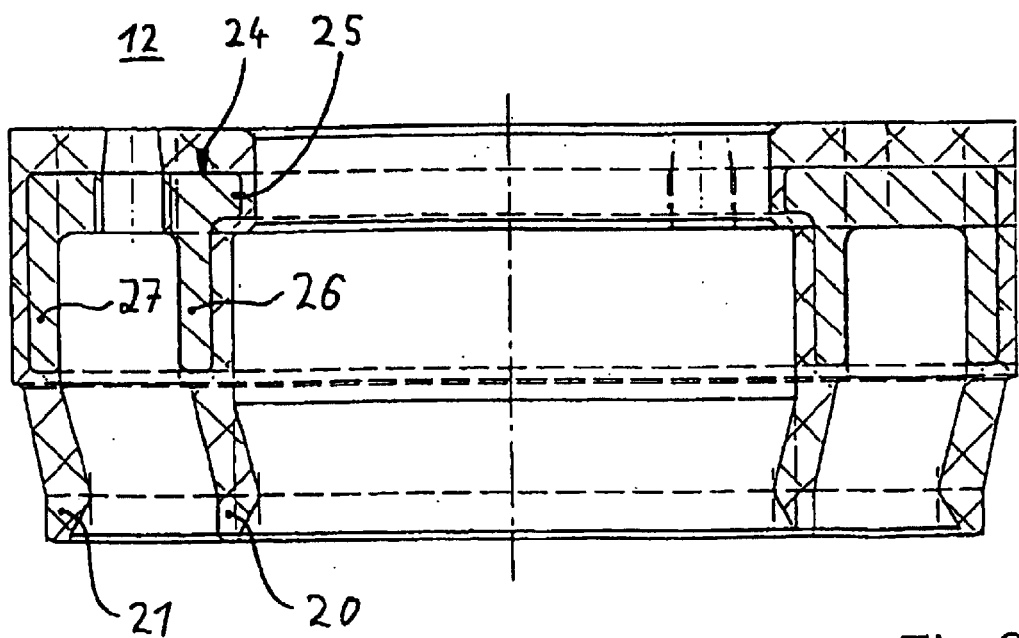
FIG. 3 is a separate longitudinal cross-section view through the sealing cup of the embodiment of FIG. 1.

According to FIG. 3, the sealing cup 12 has an internal ring-shaped reinforcing insert 24, which is designed essentially in the shape of a U according to the cross section of the edge. The reinforcing insert 24 is made here of a relatively rigid plastic, as compared to the elastomeric sealing material of the sealing cup 12, and is incorporated by vulcanizing into the sealing cup 12. The reinforcing insert 24 is provided with a shoulder 25, which is oriented radially towards the inside, in order to reinforce additionally the inside radial area of the sealing area 13. Two legs 26 and 27 of the reinforcing insert 24 project into the respective two sealing lip segments 20 and 21, in order to increase the stability properties of the sealing cup 12 and to improve in this respect the sealing properties. The two sealing lip segments 20, 21 of the sealing lip cup 12 are designed here the same length and act together with also equally long, but shorter legs 26, 27 of the internal reinforcing insert 24.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. For example, the length and diameter ratios of the sealing cup can vary in the scope of the protection.

What is claimed is:

1. An electropneumatic regulating valve for an air brake system of a motor vehicle, comprising a valve housing, which contains an axially adjustable control piston which can be actuated by at least one electromagnetic pilot valve for axial adjustment, and which is provided to actuate a valve seat assembly, to switch compressed air flow between at least one of an external brake line connection, a feed pressure connection, and a venting port, said valve seat assembly including a pot-like sealing cup with a coaxial passage, and a circular ring-shaped sealing area which corresponds to a coaxial valve seat arrangement formed by an external valve seat and an internal valve seat, wherein the sealing cup includes an internal reinforcing insert, which is formed essentially in the shape of a U according to the cross section of the edge and which is provided with a molded-on shoulder, which is oriented radially towards the inside and reinforces the inside radial area of the sealing area, whereby the two legs of the reinforcing insert project reinforcingly into respective sealing lip segments of the sealing cup.

2. An electropneumatic valve, as claimed in claim 1, wherein the reinforcing insert is made of a relatively rigid plastic as compared to the elastomeric sealing material of the sealing cup, and which can be vulcanized into the sealing cup.

3. An electropneumatic valve, as claimed in claim 1, wherein the reinforcing insert is made of steel or aluminum.

4. An electropneumatic valve, as claimed in claim 1, wherein the sealing lip segments of the sealing lip cup are approximately the same length and interact with are reinforced along a portion of their length by the legs of the internal reinforcing insert, said legs being also of equal length, and shorter than the length of the sealing lip segments.

5. An electropneumatic valve, as claimed in claim 1, wherein a tube segment with a venting duct runs through the passage in the sealing cup in order to guide exhaust air, accumulated while venting a control chamber, directly into the area of the venting port.

6. An electropneumatic valve, as claimed in claim 2, wherein a tube segment with a venting duct runs through the passage in the sealing cup, in order to guide exhaust air, accumulated while venting a control chamber, directly into the area of the venting port.

7. An electropneumatic valve, as claimed in claim 3, wherein a tube segment with a venting duct runs through the passage in the sealing cup, in order to guide exhaust air, accumulated while venting the a control chamber, directly into the area of the venting port.

8. An electropneumatic valve, as claimed in claim 4, wherein a tube segment with a venting duct runs through the passage in the sealing cup, in order to guide exhaust air, accumulated while venting a control chamber, directly into the area of the venting port.

9. An electropneumatic regulating valve for an air brake system of a motor vehicle, comprising:

a valve housing;

an axially adjustable control piston disposed in the valve housing and adapted to be actuated by at least one electromagnetic pilot valve for axial adjustment; and a valve seat assembly actuated by the axially adjustable control piston to switch compressed air flow between at least one of an external brake line connection, a feed pressure connection, and a venting port, wherein said valve seat assembly includes a coaxial valve seat arrangement formed by an external valve seat and an internal valve seat, and a sealing cup, the sealing cup including a ring-shaped sealing area adapted to seal a gap between the external valve seat and the internal valve seat, two coaxial sealing lip segments project from a face of the ring-shaped sealing area opposite the coaxial valve seats, a U-shaped internal reinforcing insert disposed in an annular gap between the coaxial sealing lip segments, wherein the reinforcing insert has a center section reinforcing the sealing area, two legs, each leg reinforcing a corresponding sealing lip segment, and a shoulder projecting radially inward and reinforcing an inside radial area of sealing area, and a coaxial passage.

10. The electropneumatic valve of claim 9, wherein the sealing cup is formed from an elastomeric sealing material, and the reinforcing insert is formed from a plastic material which is more rigid than the elastomeric sealing material.

11. The electropneumatic valve of claim 10, wherein the reinforcing insert is vulcanized into the sealing cup.

12. The electropneumatic valve of claim 9, wherein the reinforcing insert is made of steel or aluminum.

13. The electropneumatic valve of claim 9, wherein the sealing lip segments are of equal length, the reinforcing insert legs are of equal length and shorter than the sealing lip segments, and the sealing lip segments are reinforced along a portion of their length by the reinforcing legs.

14. The electropneumatic valve of claim 9, wherein a tube segment with a venting duct which vents a control chamber directly to the venting port is disposed through the sealing cup coaxial passage.

15. The electropneumatic valve of claim 10, wherein a tube segment with a venting duct which vents a control chamber directly to the venting port is disposed through the sealing cup coaxial passage.

16. The electropneumatic valve of claim 11, wherein a tube segment with a venting duct which vents a control chamber directly to the venting port is disposed through the sealing cup coaxial passage.

17. The electropneumatic valve of claim 12, wherein a tube segment with a venting duct which vents a control chamber directly to the venting port is disposed through the sealing cup coaxial passage.

18. The electropneumatic valve of claim 13, wherein a tube segment with a venting duct which vents a control chamber directly to the venting port is disposed through the sealing cup coaxial passage.

* * * * *